United States Patent
Thayer et al.

(10) Patent No.: US 12,370,630 B2
(45) Date of Patent: Jul. 29, 2025

(54) METHOD AND SYSTEM FOR PREVENTING BACK STRIKES WHEN LASER DRILLING HOLLOW PARTS

(71) Applicant: United Technologies Corporation, Farmington, CT (US)

(72) Inventors: Henry H. Thayer, Wethersfield, CT (US); Dmitri Novikov, Avon, CT (US)

(73) Assignee: RTX Corporation, Farmington, CT (US)

( * ) Notice: Subject to any disclaimer, the term of this patent is extended or adjusted under 35 U.S.C. 154(b) by 1204 days.

(21) Appl. No.: 16/746,246

(22) Filed: Jan. 17, 2020

(65) Prior Publication Data

US 2021/0220950 A1    Jul. 22, 2021

(51) Int. Cl.
| | |
|---|---|
| *B23K 26/382* | (2014.01) |
| *B23K 26/16* | (2006.01) |
| *B23K 26/18* | (2006.01) |
| *B23K 37/006* | (2025.01) |
| *B23K 101/00* | (2006.01) |
| *B23K 101/04* | (2006.01) |

(52) U.S. Cl.
CPC ............ *B23K 26/389* (2015.10); *B23K 26/16* (2013.01); *B23K 26/18* (2013.01); *B23K 37/006* (2013.01); *B23K 2101/001* (2018.08); *B23K 2101/04* (2018.08)

(58) Field of Classification Search
CPC .... B23K 26/382; B23K 26/38; B23K 26/389; B23K 26/16; B23K 26/18; B23K 26/14; B23K 26/142; B23K 26/146
USPC ............................................ 219/121.7, 121.6
See application file for complete search history.

(56) References Cited

U.S. PATENT DOCUMENTS

| | | | |
|---|---|---|---|
| 5,049,722 A | 9/1991 | Corfe | |
| 5,222,617 A | 6/1993 | Gregory | |
| 6,365,871 B1 * | 4/2002 | Knowles | ................ B23K 26/18 |
| | | | 219/121.7 |
| 6,696,666 B2 | 2/2004 | Merdan | |
| 9,238,265 B2 | 1/2016 | Bonini | |

(Continued)

FOREIGN PATENT DOCUMENTS

| | | | |
|---|---|---|---|
| CN | 104827194 A | 8/2015 | |
| DE | 102013218196 A1 * | 3/2015 | ............. B23K 26/18 |

(Continued)

OTHER PUBLICATIONS

Machine translation of DE 102015209261 performed on Mar. 17, 2022.*

(Continued)

*Primary Examiner* — Steven W Crabb
*Assistant Examiner* — Alba T Rosario-Aponte
(74) *Attorney, Agent, or Firm* — Getz Balich LLC

(57) ABSTRACT

A method for forming a hollow component includes injecting a fluid into an internal cavity of the hollow component to achieve a pressure of the fluid within the internal cavity that is greater than an ambient pressure. The method further includes drilling at least one hole through the hollow component from an external surface of the hollow component to the internal cavity by applying a laser beam to the hollow component with a laser generator. The method further includes directing the fluid from the internal cavity and through the at least one hole so as to exit the hollow component via the at least one hole.

17 Claims, 7 Drawing Sheets

(56) References Cited

U.S. PATENT DOCUMENTS

| | | | |
|---|---|---|---|
| 9,468,991 B2 | 10/2016 | McDowell | |
| 9,662,743 B2 | 5/2017 | Hu | |
| 9,770,785 B2* | 9/2017 | Hu | B23K 26/389 |
| 2003/0201087 A1 | 10/2003 | Devine | |
| 2007/0193990 A1* | 8/2007 | Richerzhagen | B23K 26/146 |
| | | | 219/121.84 |
| 2013/0056143 A1* | 3/2013 | Cuttell | B23K 26/382 |
| | | | 156/250 |
| 2013/0146570 A1* | 6/2013 | Forsman | B23K 26/389 |
| | | | 219/121.7 |
| 2016/0167174 A1* | 6/2016 | Unger | B23K 26/18 |
| | | | 219/121.72 |

FOREIGN PATENT DOCUMENTS

| | | | | |
|---|---|---|---|---|
| DE | 102015209261 A1 * | 11/2016 | | B23K 26/144 |
| WO | 8903274 W | 4/1989 | | |
| WO | 2000069594 A1 | 11/2000 | | |
| WO | 2015036441 A2 | 3/2015 | | |
| WO | 2019020741 A1 | 1/2019 | | |

OTHER PUBLICATIONS

Machine translation of DE 102013218196 performed on Mar. 17, 2022.*

EP search report for EP21151529.1 dated Jun. 11, 2021.

\* cited by examiner

METHOD AND SYSTEM FOR PREVENTING BACK STRIKES WHEN LASER DRILLING HOLLOW PARTS

BACKGROUND

1. Technical Field

This disclosure relates generally to the manufacture of cast components, and more particularly to laser drilling holes in hollow cast components.

2. Background Information

Many components of gas turbine engines include internal cooling passages as well as small-diameter cooling holes extending through the components. For example, hollow castings, such as airfoils for a high-pressure turbine, may be laser drilled to provide cooling holes extending between an internal cooling cavity or passage and an exterior surface of the casting. However, laser drilling of such components poses the problem of back striking which can lead to damage of internal walls of the casting during laser drilling.

Conventionally, in order to prevent back striking, castings have been filled with materials such as wax, epoxy, or some other organic compound, prior to laser drilling, to attenuate the laser energy. This technique can be effective but is time consuming and requires the extra steps of filling the internal cavities of the casting with the material and subsequently burning or leaching out the material after laser drilling. Accordingly, what is needed is an improved way of preventing back striking during laser drilling of a component.

SUMMARY

It should be understood that any or all of the features or embodiments described herein can be used or combined in any combination with each and every other feature or embodiment described herein unless expressly noted otherwise.

According to an embodiment of the present disclosure, a method for forming a hollow component includes injecting a fluid into an internal cavity of the hollow component to achieve a pressure of the fluid within the internal cavity that is greater than an ambient pressure. The method further includes drilling at least one hole through the hollow component from an external surface of the hollow component to the internal cavity by applying a laser beam to the hollow component with a laser generator. The method further includes directing the fluid from the internal cavity and through the at least one hole so as to exit the hollow component via the at least one hole.

In the alternative or additionally thereto, in the foregoing embodiment, the at least one hole includes a plurality of holes.

In the alternative or additionally thereto, in the foregoing embodiment, drilling the plurality of holes through the hollow component includes sequentially drilling each hole of the plurality of holes progressively from a first position of the hollow component to a second position of the hollow component. The second position is higher than the first position.

In the alternative or additionally thereto, in the foregoing embodiment, injecting the fluid into the internal cavity of the hollow component includes controlling a flow rate of the fluid from a fluid source to the hollow component.

In the alternative or additionally thereto, in the foregoing embodiment, the method further includes maintaining a predetermined fluid pressure within the internal cavity of the hollow component as the plurality of holes are sequentially drilled.

In the alternative or additionally thereto, in the foregoing embodiment, the method further includes collecting the fluid which exits the plurality of holes.

In the alternative or additionally thereto, in the foregoing embodiment, the method further includes returning the collected fluid to the fluid source.

In the alternative or additionally thereto, in the foregoing embodiment, returning the collected fluid to the fluid source includes passing the fluid through a filter.

In the alternative or additionally thereto, in the foregoing embodiment, the fluid includes water.

In the alternative or additionally thereto, in the foregoing embodiment, the fluid further includes a dye.

In the alternative or additionally thereto, in the foregoing embodiment, the method further includes flushing the hollow component with a second fluid, different than the fluid, subsequent to drilling the plurality of holes through the hollow component.

In the alternative or additionally thereto, in the foregoing embodiment, the method further includes fluidly coupling the hollow component to the fluid source with a seal.

According to another embodiment of the present disclosure, a system includes a hollow component including an external surface and an internal cavity. The hollow component includes at least one hole extending through the hollow component between the external surface and the internal cavity. The system further includes a drilling apparatus. The drilling apparatus includes a laser generator configured to apply a laser beam to the hollow component. The drilling apparatus further includes a fluid source containing a fluid. The drilling apparatus further includes a pump in fluid communication with the fluid source and the internal cavity of the hollow component. The pump is configured to inject the fluid into the internal cavity of the hollow component so as to achieve a pressure of the fluid within the internal component that is greater than an ambient pressure.

In the alternative or additionally thereto, in the foregoing embodiment, the at least one hole includes a plurality of holes.

In the alternative or additionally thereto, in the foregoing embodiment, the drilling apparatus further includes a collector disposed underneath the hollow component. The collector is fluidly coupled to the fluid source.

In the alternative or additionally thereto, in the foregoing embodiment, the drilling apparatus further includes a filter fluidly coupling the collector and the fluid source.

In the alternative or additionally thereto, in the foregoing embodiment, the drilling apparatus further includes a sensor configured to determine the pressure of the fluid in the internal cavity of the hollow component.

In the alternative or additionally thereto, in the foregoing embodiment, the pump is configured to maintain a predetermined fluid pressure within the internal cavity of the hollow component.

In the alternative or additionally thereto, in the foregoing embodiment, the fluid includes water.

According to another embodiment of the present disclosure, a method for forming a hollow component includes injecting a fluid into an internal cavity of the hollow component to achieve a pressure of the fluid within the internal cavity that is greater than an ambient pressure. The method further includes sequentially drilling a plurality of holes through the hollow component from an external surface of the hollow component to the internal cavity by applying a laser beam to the hollow component with a laser generator. The plurality of holes are drilled progressively from a first position of the hollow component to a second position of the hollow component. The second position is higher than the first position. The method further includes directing the fluid from the internal cavity and through the plurality of holes so as to exit the hollow component via the plurality of holes. The method further includes controlling a flow rate of the fluid from a fluid source to the hollow component so as to maintain a predetermined fluid pressure within the internal cavity of the hollow component as the plurality of holes are sequentially drilled.

The present disclosure, and all its aspects, embodiments and advantages associated therewith will become more readily apparent in view of the detailed description provided below, including the accompanying drawings.

DETAILED DESCRIPTION

Figure 1:
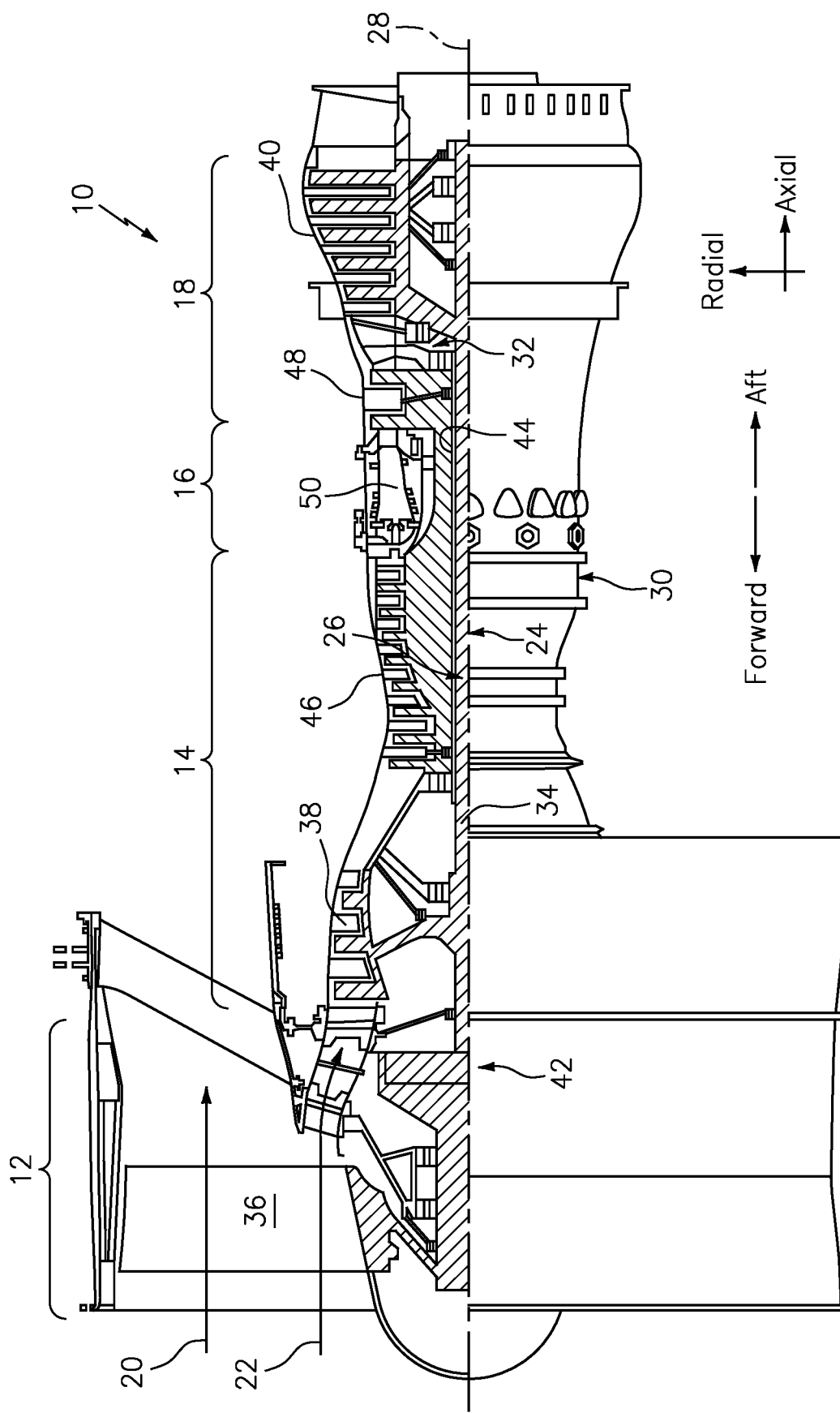
FIG. 1 illustrates a cross-sectional side view of a gas turbine engine in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2A:
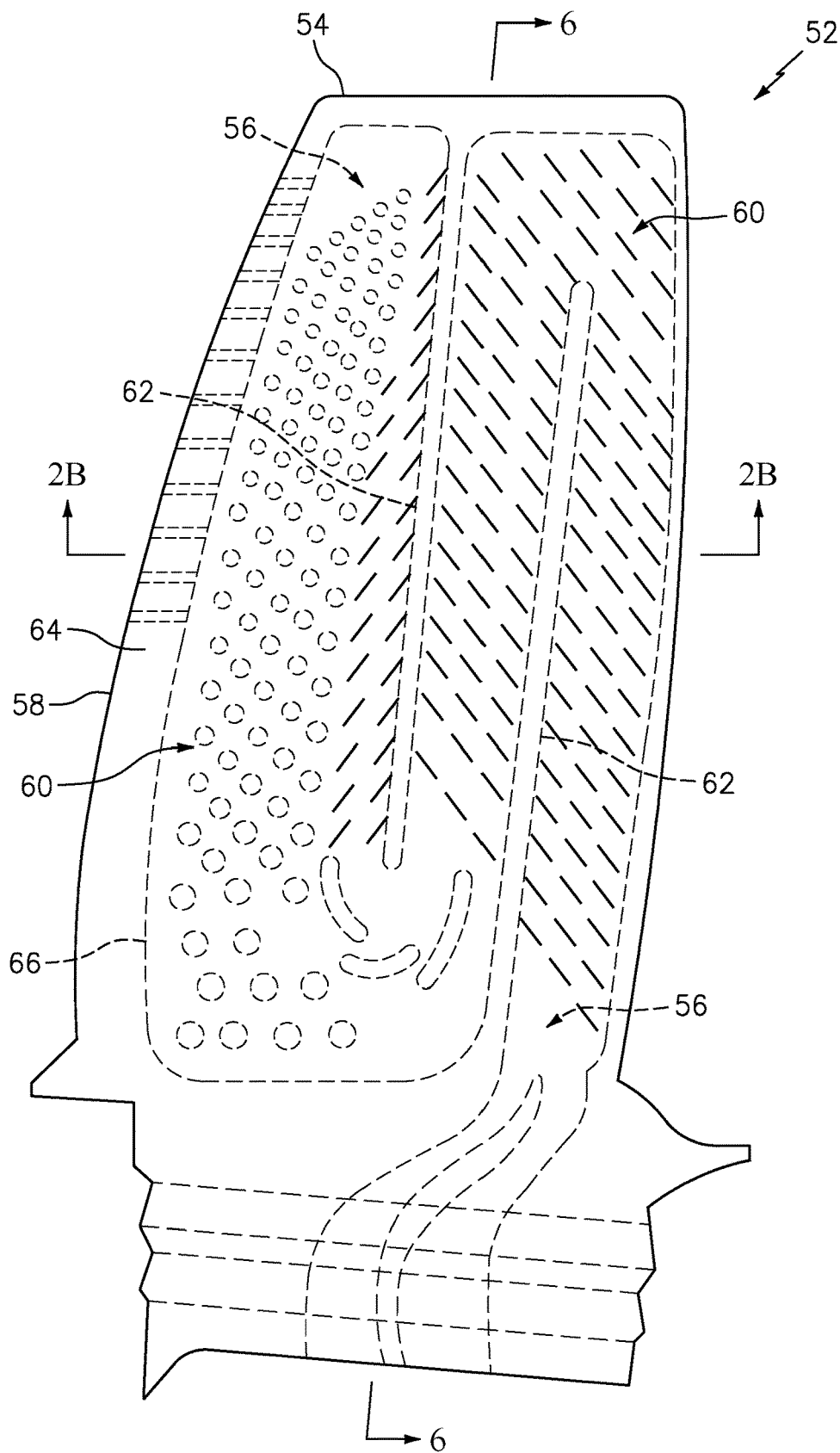
FIG. 2A illustrates an exemplary component in accordance with one or more embodiments of the present disclosure.
Figure 2B:
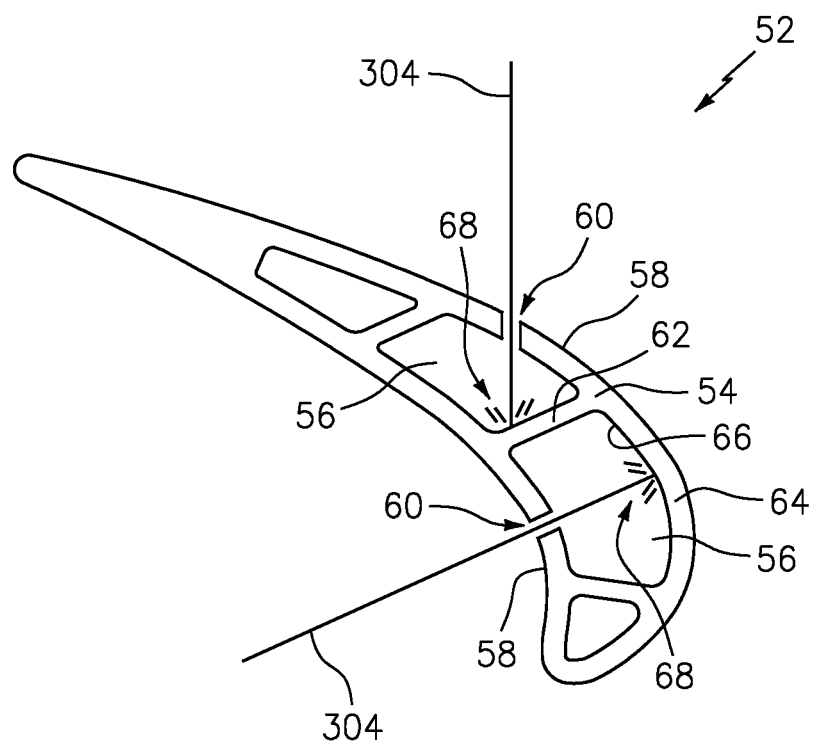
FIG. 2B illustrates a cross-sectional view of the component of FIG. 2A taken along line 2B-2B in accordance with one or more embodiments of the present disclosure.

Referring to FIGS. 2A and 2B, the gas turbine engine 10 may include one or more components 52 which may be configured as hollow castings. For example, as illustrated in FIG. 2A, the component 52 may be an airfoil configured for use in the compressor section 14 and/or the turbine section 18 of the gas turbine engine. However, as will be understood from the present disclosure, the component 52 may be any suitable gas turbine engine 10 component requiring the drilling of holes therethrough, such as, but not limited to, airfoils, vanes, combustor wall assembly components, etc.

The component 52 includes a component body 54 defining one or more internal cavities 56. The component body 54 includes an external wall 64 having an external surface 58 and an internal surface 66. A plurality of holes 60 (e.g., air cooling holes) are formed through the component body 54 of the component 52 between the internal cavity 56 and the external surface 58. The plurality of holes 60 may be formed through the component body 54, for example, by drilling subsequent to formation of the component body 54. For example, laser drilling of the plurality of holes 60 may be used to quickly produce hundreds or thousands of holes with a high degree of accuracy. However, the component body 54 may be susceptible to damage from back strikes during laser drilling of the plurality of holes 60. A back strike is an event which occurs when, for example, a drill bit, laser, EDM electrode, machining process/component, etc. passes through the component body 54 from the external surface 58, into the internal cavity 56, and contacts an internal wall 62 of the component 52 or an internal surface 66 of the external wall 64 of the component 52, opposite the hole being drilled, potentially causing damage to the internal wall 62 or the internal surface 66 of the external wall 64 (see, e.g., FIG. 2B illustrating exemplary back strike locations 68 caused by, for example, a laser beam 304).

Figure 3:
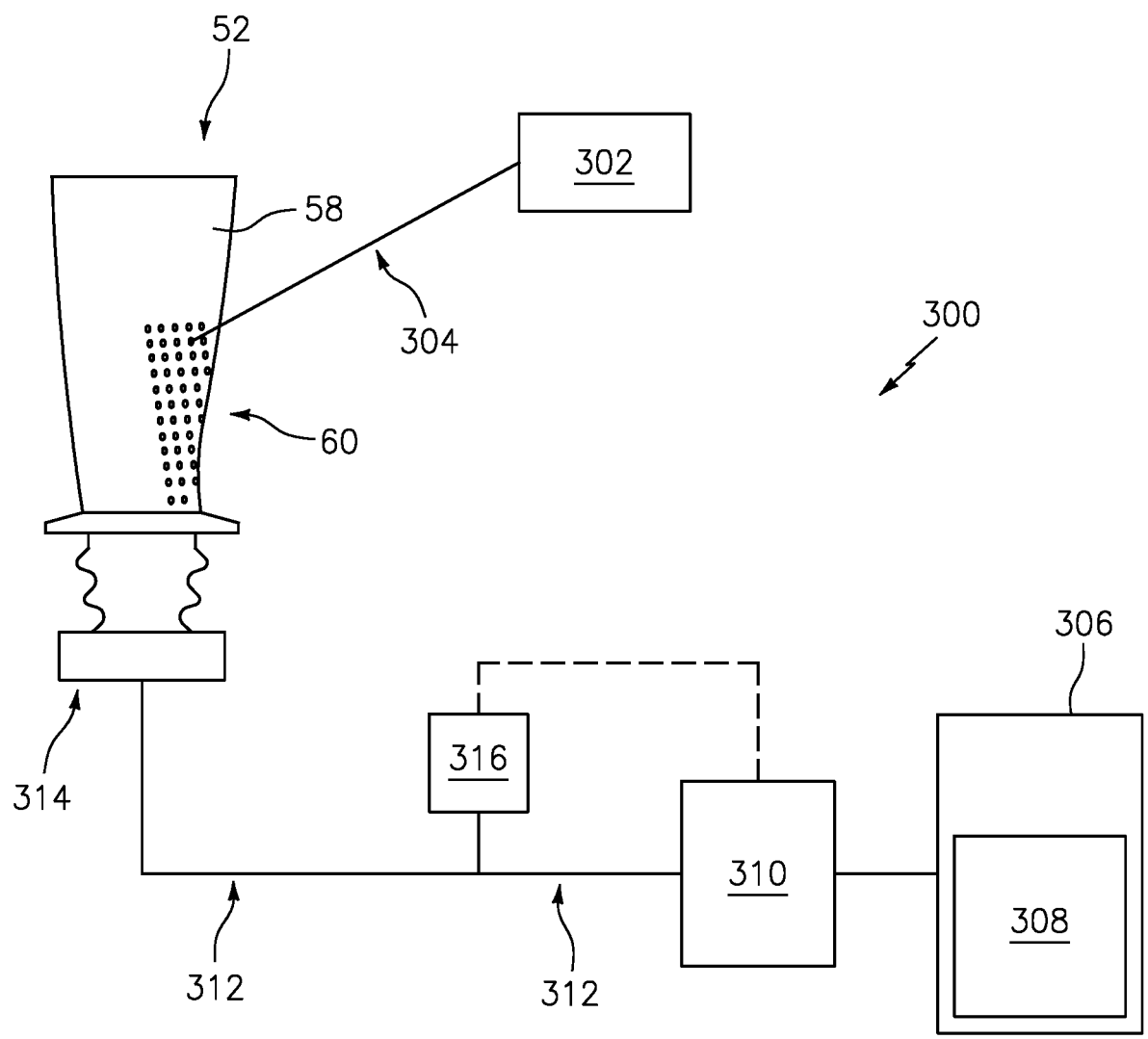
FIG. 3 illustrates a block diagram of a drilling apparatus in accordance with one or more embodiments of the present disclosure.
Figure 4:
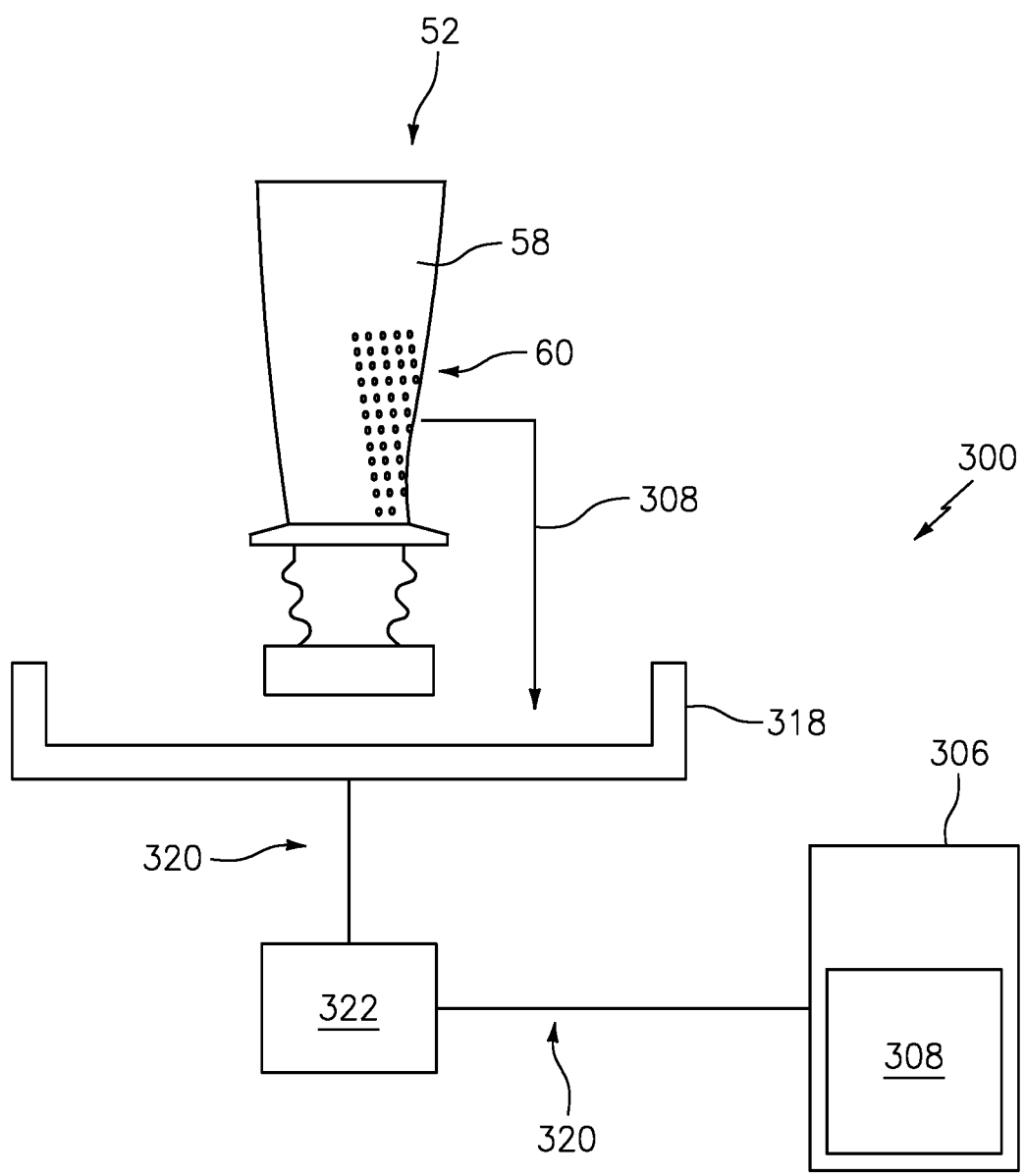
FIG. 4 illustrates a block diagram of a drilling apparatus in accordance with one or more embodiments of the present disclosure.
Figure 5:
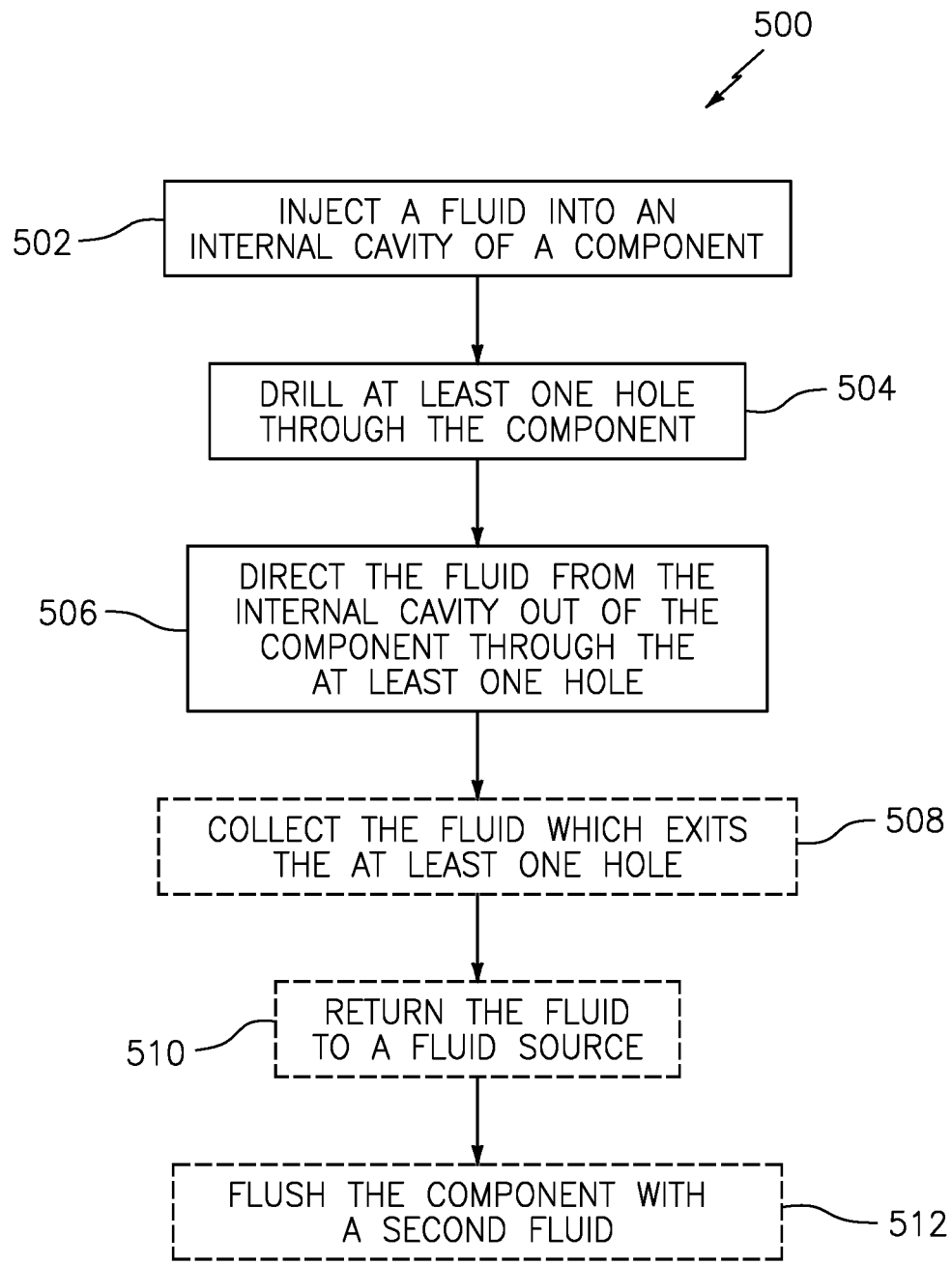
FIG. 5 illustrates a flowchart depicting a method for forming a hollow component in accordance with one or more embodiments of the present disclosure.
Figure 6A:
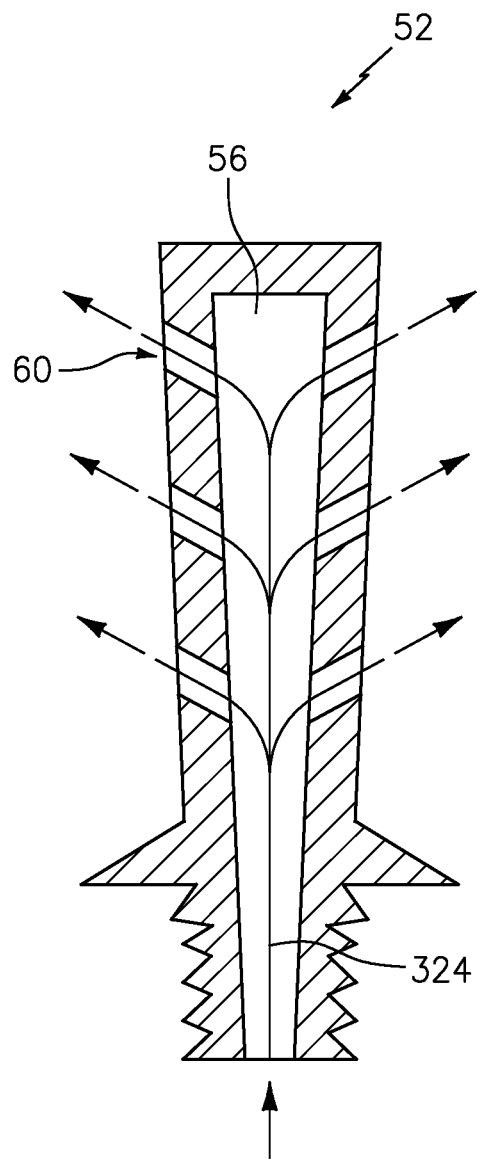
FIG. 6A illustrates a cross-sectional view of the component of FIG. 2A taken along line 6-6 in accordance with one or more embodiments of the present disclosure.
Figure 6B:
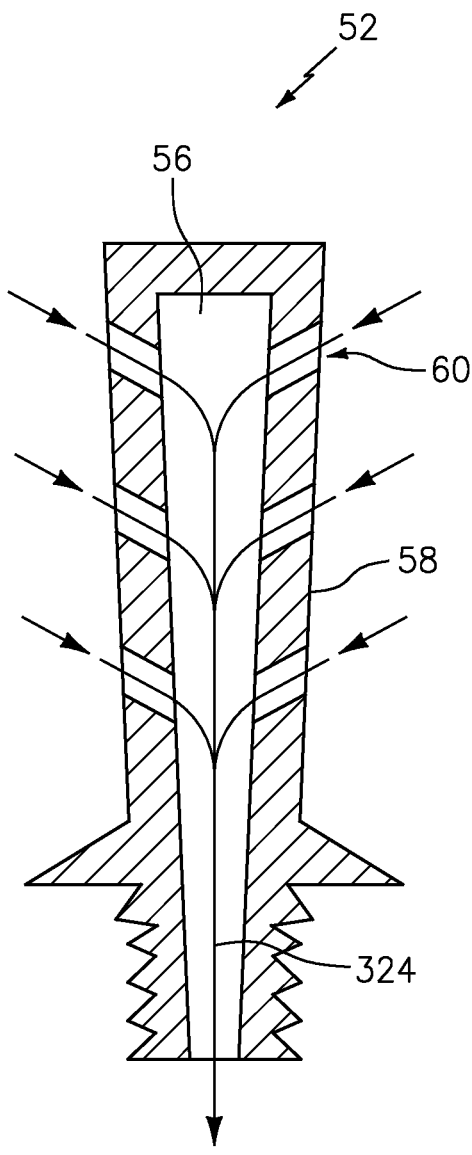
FIG. 6B illustrates a cross-sectional view of the component of FIG. 2A taken along line 6-6 in accordance with one or more embodiments of the present disclosure.

Referring to FIGS. 3 and 4, a block diagram of a drilling apparatus 300 is illustrated. The drilling apparatus 300 includes a laser generator 302 configured to apply the laser beam 304 to the component 52 for drilling the plurality of holes 60 through the component body 54 from the external surface 58 to the internal cavity 56. In various embodiments, the laser generator 302 in configured to move in one or more of an x-, a y-, and a z-direction, rotate, and/or tilt relative to the component 52 so as to form each hole of the plurality of holes 60 in the desired location and with the desired orientation.

The drilling apparatus 300 includes a fluid source 306 configured to contain a fluid 308. A pump 310 is in fluid communication with the fluid source 306 and the internal cavity 56 of the component 52 via one or more conduits 312. The pump 310 is configured to inject the fluid 308 into the internal cavity 56 of the component 52 so as to achieve a pressure of the fluid 308 within the internal cavity 56 that is greater than an ambient pressure (i.e., a pressure external to the component 52, e.g., atmospheric pressure). As a result of the pressure of the fluid 308 within the internal cavity 56 being greater than ambient pressure, the fluid 308 may directed from the internal cavity 56 and through the plurality of holes 60, as the plurality of holes 60 are formed, so as to exit the component 52 via the plurality of holes 60. In various embodiments, a seal 314 may be used to fluidly couple the fluid source 306, pump 310, and conduits 312 to the internal cavity 56 of the component 52 and to minimize or eliminate any leakage of fluid 308.

The drilling apparatus 300 may include one or more sensors 316 disposed in the conduit 312 between the component 52 and the pump 310. The one or more sensors 316 may include, for example, fluid pressure sensors, fluid flow sensors, fluid temperature sensors, etc. The one or more sensors 316 may be in signal communication with the pump 310. Accordingly, the pump 310 may be, for example, a variable flow pump configured to control a flow rate of the fluid 308 injected into the internal cavity 56 of the component 52 based on an output of the one or more sensors 316. In various embodiments, the pump 310 may include one or more valves configured to control the flow rate of the fluid 308 injected into the internal cavity 56 of the component 52.

In various embodiments, the drilling apparatus 300 may include a collector 318 configured to collect the fluid 308 which exits the component 52 via the plurality of holes 60. For example, the collector 318 may be disposed underneath the component 52 such that fluid 308 exiting the component 52 via the plurality of holes 60 may fall into the collector 318. The collector 318 may be in fluid communication with the fluid source 306 via one or more conduits 320. Accordingly, fluid 308 which exits the component 52 via the plurality of holes 52 may be returned to the fluid source 306 and again injected into the internal cavity 56 of the component 52 by the pump 310. In various embodiments, the drilling apparatus may include a filter 322 disposed between and in fluid communication with the collector 318 and the fluid source 306 to filter impurities (e.g., recast material formed during laser drilling of the component 52) from the fluid 308. In various embodiments, Referring to FIGS. 2-6, a method 500 for forming a hollow component (e.g., the component 52) is disclosed. In Step 502, the pump 310 injects the fluid 308 from the fluid source 306 into the internal cavity 56 of the component 52 to achieve a pressure of the fluid 308 within the internal cavity 56 that is greater than the ambient pressure external to the component 52.

In Step 504, the laser generator 302 drills the plurality of holes 60 through the component 52 from the external surface 58 of the component 52 to the internal cavity 56 by applying the laser beam 304 to the component 52. The fluid 308 present in the internal cavity 56 may attenuate the laser beam 304 as it enters the internal cavity 56, thereby preventing or reducing damage to the internal wall 62 of the component 52 by preventing the back strike or reducing the energy density or concentration of the laser beam 304 such that the laser beam 304 does not damage the internal wall 62.

In Step 506, the fluid 308 is directed from the internal cavity 56 of the component 52 through the plurality of holes 60, as a result of the pressure of the fluid 308 in the internal cavity 56 greater than the ambient pressure, so as to exit the component 52 via the plurality of holes 60. As a result of the positive pressure of the fluid 308 within the internal cavity 56 relative to ambient pressure, flow of the fluid 308 through a hole of the plurality of holes 60 may begin immediately upon completion of the hole from the external surface 58 to the internal cavity 56. The fluid 308 may, therefore, immediately provide cooling to the material of the component body 54 surrounding the hole and may cause molten material of the component body 54, formed during laser drilling, to solidify. Continued flow of the fluid 308 through the plurality of holes 60 and, in various embodiments, down the external surface 58 of the component 52, during drilling, may additionally provide cooling to the component body 54 such that the component body 54 can accommodate a faster rate of laser drilling without experiencing an adverse increase in temperature. Directing the fluid 308 out of the internal cavity 56 through the plurality of holes 60 may allow recast material (e.g., loose material of the component body 54 formed during laser drilling) and other debris to be flushed from the component 52. Directing the fluid 308 out of the internal cavity 56 through the plurality of holes 60 may also cause any air trapped within the internal cavity 56 to be flushed from the component 52 via the plurality of holes 60. Air trapped within the internal cavity 56 may prevent attenuation of a laser beam 304 entering the internal cavity 56 by causing the fluid 308 to be locally displaced. Accordingly, flushing trapped air from the internal cavity 56 by directly the fluid 308 to exit the internal cavity 56 via the plurality of holes 60 may further reducing the likelihood of damage to the internal wall 62 as a result of a back strike.

In various embodiments, drilling the plurality of holes 60, as discussed above with respect to Step 504, may include sequentially drilling each hole of the plurality of holes 60 progressively from a first position of the component 52 to a second position of the component 52 which is higher than the first position, relative to a gravitational field. As a result, fluid 308 exiting the plurality of holes 60 or fluid 308 disposed on the external surface 58 of the component 52 may not interfere with the laser drilling of subsequent holes of the plurality of holes which may be formed at a higher position relative to previously drilled holes.

In various embodiments, injecting the fluid 308 into the internal cavity 56 of the component 52, as discussed above with respect to Step 502, may include controlling a flow rate of the fluid 308, with the pump 310, from the fluid source 306 to the component 52. For example, the pump 310, may maintain a predetermined pressure of the fluid 308 within the internal cavity 56 of the component 52 as the plurality of holes 60 are sequentially drilled. The pump 310 may maintain the predetermined pressure of the fluid 308 within the internal cavity 56 based on, for example, the output of the one or more sensors 316. For example, the pump 310 may maintain a predetermined pressure of the fluid 308 within the internal cavity 56 which is greater than ambient pressure. In various embodiments, the pump 310 may maintain a predetermined pressure of the fluid 308 within the internal cavity which is at least one pound per square inch (psi) greater than the ambient pressure. Accordingly, as the number of holes in the plurality of holes 60 increases, the pump 310 may increase the rate of flow of the fluid 308 injected into the internal cavity 56 in order to maintain the predetermined pressure of the fluid 308 within the cavity (e.g., to compensate for the increasing number of holes of the plurality of holes 60). The predetermined pressure may be determined based on one or more factors, for example, a height of the component 52, a desired amount of cooling or flushing to be provided to the component 52, or a velocity of the fluid 308 exiting the component 52 via the plurality of holes 60.

In various embodiments, the method 500 may include collecting the fluid 308 exiting the component 52 via the plurality of holes 60 with the collector 318 in Step 508. In Step 510, the fluid 308 collected by the collector 318 may be returned to the fluid source 306 for reuse by the pump 310 in Step 502. In various embodiments, returning the collected fluid to the fluid source 306 may include passing the fluid 308 through the filter 322 to remove any recast material or other debris from the component 52 prior to reintroducing the fluid 308 to the fluid source 306.

The fluid 308 may be, for example, a liquid configured to absorb or scatter the laser beam 304 upon entry of the laser beam 304 into the internal cavity 56 of the component 52. For example, in various embodiments, the fluid 308 may be water. In various other embodiments, the fluid 308 may include one or more dyes configured to improve the laser energy attenuation effectiveness of the fluid 308. The dye may be an opaque dye and may be organic/carbon based (e.g., carbon black) such that the dye can be removed from the component 52 during a burnout cycle.

In various embodiments, the method 500 may include flushing the component 52 subsequent to laser drilling the plurality of holes 60 through the component 52, in Step 512. In various embodiments, flushing the component 52 may be performed with a second fluid 324 which is different than the fluid 308. Flushing the component 52 with the second fluid 324 may allow dye, recast material, or debris to be removed from the component 52 after the laser drilling process has been completed. In various embodiments, flushing the component 52 may include supplying the second fluid 324 to the internal cavity 56 of the component 52 and directing the second fluid 324 out of the component 52 through the plurality of holes 60 (see, e.g., FIG. 6A). Alternatively, in various other embodiments, flushing the component 52 may include supplying the second fluid 324 to the external surface 58 of the component 52 and directing the second fluid 324 into the internal cavity 56 of the component 52 through the plurality of holes 60 and subsequently out of the component 52 (see, e.g., FIG. 6B). In various embodiments, the second fluid 324 used for flushing the component 52 may be collected in a manner similar to that described above with respect to Steps 508 and 510.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A method for drilling a plurality of holes in a hollow component, the method comprising:
    injecting a fluid into an internal cavity of the hollow component to achieve a pressure of the fluid within the internal cavity that is greater than an ambient pressure;
    drilling the plurality of holes through the hollow component from an external surface of the hollow component to the internal cavity by applying a laser beam to the hollow component with a laser generator, drilling the plurality of holes through the hollow component including sequentially drilling each hole of the plurality of holes progressively from a first position of the hollow component to a second position of the hollow component, the second position higher than the first position; and
    directing the fluid from the internal cavity and through the at least one hole so as to exit the hollow component via the at least one hole.

2. The method of claim 1, wherein injecting the fluid into the internal cavity of the hollow component comprises controlling a flow rate of the fluid from a fluid source to the hollow component.

3. The method of claim 2, further comprising maintaining a predetermined fluid pressure within the internal cavity of the hollow component as the plurality of holes are sequentially drilled.

4. The method of claim 3, further comprising collecting the fluid which exits the plurality of holes.

5. The method of claim 4, further comprising returning the collected fluid to the fluid source.

6. The method of claim 5, wherein returning the collected fluid to the fluid source includes passing the fluid through a filter.

7. The method of claim 1, wherein the fluid comprises water.

8. The method of claim 7, wherein the fluid further comprises a dye.

9. The method of claim 8, further comprising flushing the hollow component with a second fluid, different than the fluid, subsequent to drilling the plurality of holes through the hollow component.

10. The method of claim 1, further comprising fluidly coupling the hollow component to the fluid source with a seal.

11. A method for drilling a plurality of holes in a hollow component, the method comprising:

injecting a fluid into an internal cavity of the hollow component to achieve a pressure of the fluid within the internal cavity that is greater than an ambient pressure;

sequentially drilling a plurality of holes through the hollow component from an external surface of the hollow component to the internal cavity by applying a laser beam to the hollow component with a laser generator, the plurality of holes drilled progressively from a first position of the hollow component to a second position of the hollow component, the second position higher than the first position;

directing the fluid from the internal cavity and through the plurality of holes so as to exit the hollow component via the plurality of holes; and controlling a flow rate of the fluid from a fluid source to the hollow component so as to maintain a predetermined fluid pressure within the internal cavity of the hollow component as the plurality of holes are sequentially drilled by increasing the flow rate of the fluid as the plurality of holes are sequentially drilled.

12. The method of claim 11, further comprising collecting the fluid which exits the plurality of holes.

13. The method of claim 12, further comprising returning the collected fluid to the fluid source.

14. The method of claim 13, wherein returning the collected fluid to the fluid source includes passing the fluid through a filter.

15. The method of claim 11, wherein the fluid comprises water.

16. The method of claim 15, wherein the fluid further comprises a dye.

17. The method of claim 16, wherein the dye is a carbon black dye.

* * * * *